United States Patent [19]
McGill

[11] Patent Number: 4,903,720
[45] Date of Patent: Feb. 27, 1990

[54] SAFETY SHUT OFF DEVICE

[76] Inventor: James C. McGill, Rte. 1, Box 545-A, Whites Creek, Tenn. 37189

[21] Appl. No.: 165,281

[22] Filed: Mar. 7, 1988

[51] Int. Cl.$^4$ .............................................. F16K 17/36
[52] U.S. Cl. ............................... 137/38; 200/61.45 R; 251/66
[58] Field of Search ............... 137/38, 39, 45; 251/66; 200/61.45 R, 61.52

[56] References Cited

U.S. PATENT DOCUMENTS

| | | | |
|---|---|---|---|
| 3,878,858 | 4/1975 | Yamada | 137/38 |
| 3,994,359 | 11/1976 | Smitley | 137/38 X |
| 4,103,697 | 8/1978 | Kiesow | 137/45 |
| 4,429,704 | 2/1984 | Jones | 137/45 |
| 4,475,565 | 10/1984 | Keller | 137/39 |
| 4,742,839 | 5/1988 | Stock | 137/38 |

FOREIGN PATENT DOCUMENTS 5132 of 1914 United Kingdom ................. 137/45

Primary Examiner—Robert G. Nilson
Attorney, Agent, or Firm—Wenderoth, Lind & Ponack

[57] ABSTRACT

A shock activated shut-off device which can be used in any position includes a housing, a drive member rotatably mounted within the housing, a first member movable rectilinearly from a first position to a second position and a second member movable rectilinearly from a third position to a fourth position. An inertia ball engages the first member to move it from the first position to the second position in response to a vibration or shock imparted to the housing, and movement of the first member causes movement of a trigger ball disposed between the first member and the second member. Movement of the trigger ball allows the second member to move from the third position to the fourth position and thus to release engagement between a locking ball and a locking ball receiving seat in the housing. A torsion spring is connected between the drive member and the housing, whereby the drive member can be rotated against the force of the torsion spring to load the device. In a modification, the locking ball is replaced with a cam which is moved when the second member moves from the third to the fourth position to thereby close an electric switch.

21 Claims, 2 Drawing Sheets

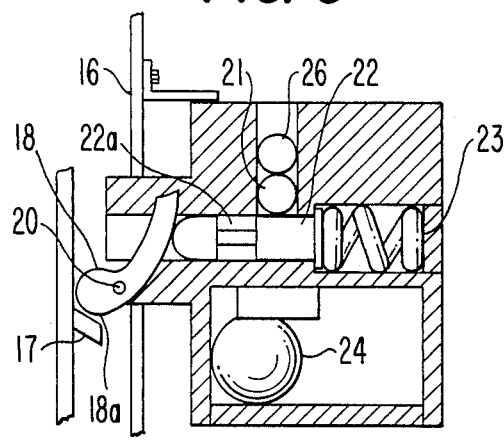
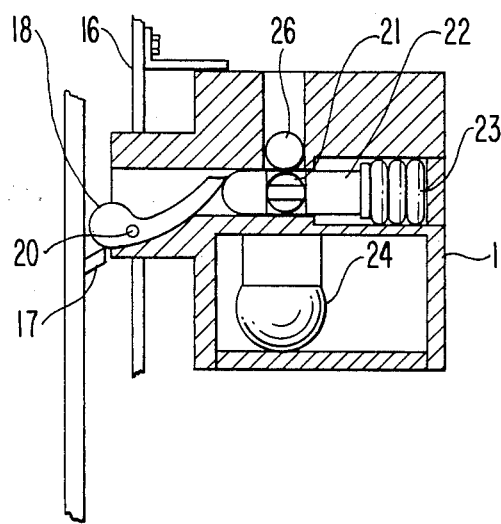
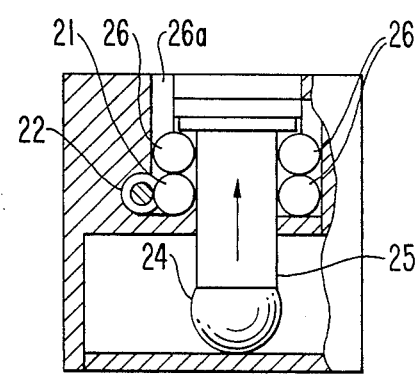
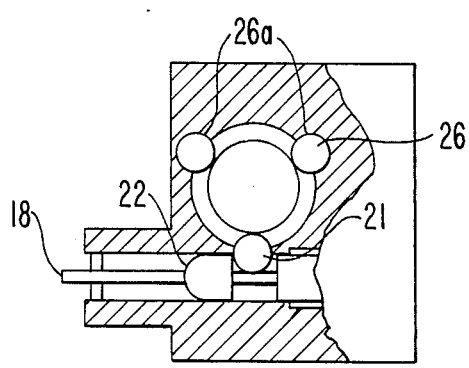
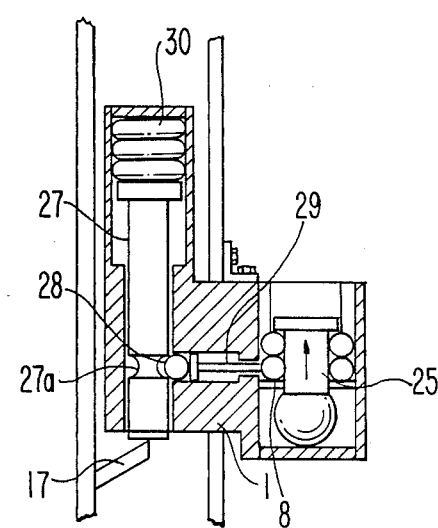

SAFETY SHUT OFF DEVICE

BACKGROUND OF THE INVENTION

1. Field of the Invention

The present invention relates to a device for cutting off power in the event of a seismic disturbance, in particular, a device for shutting off electrical switches or gas valves during seismic disturbances such as earthquakes.

2. Description of the Prior Art

Devices which automatically shut off gas, water, electricity or the like are known in the art, such as, the devices disclosed by Flauiani (USP 4,542,760) and Bujold (USP 4,546,660). The device of Flauiani is extremely complicated and apparently is oriented with an oscillator in a vertical position. On the other hand, Bujold discloses an automatic valve motor for shutting off utilities such as a gas valve in the event of an earthquake but the device is complicated and must be oriented such that a pendulum is oriented vertically.

SUMMARY OF THE INVENTION

The present invention provides an improved vibration or shock responsive safety shut-off device which can be mounted in any position for turning off a gas valve or an electric switch. Thus, the device of the present invention is useful for mechanically shutting down utility lines during an earthquake or other damaging movements of the earth.

The shut-off device of the present invention can be calibrated to respond to a predetermined shock force transmitted to the device. Thus, the device will be particularly useful for the building industry and industrial community especially in the western states, Hawaii and other countries.

The vibration or shock activated shut-off device of the present invention includes a housing, a drive assembly means supported by the housing for interrupting a supply of power from a power supply by moving a component of the power supply such as a switch or valve stem to thereby interrupt the supply of power from the power supply. The drive assembly means includes a first member which is movable rectilinearly from a first position to a second position and a second member which is movable from a third position to a fourth position, the second member being held in the third position when the first member is in the first position and the second member being movable to the fourth position when the first member is in the second position. The drive assembly means further includes an engaging means engageable with the component of the power supply and responsive to movement of the second member so that the component is in a power supplying position when the second member is in the third position and in a power interrupting position when the second member is in the fourth position, and an inertia responsive means is provided for moving the first member from the first position to the second position in response to a vibration or shock being imparted to the housing.

In a first embodiment of the invention, a drive member is supported in the housing for rotation about a rotation axis and the engaging means includes a drive member centered on the rotation axis and sized to receive a valve stem of a shut-off valve.

In a second embodiment, the engaging means comprises a cam member for engaging an electric cut-off switch, the cam member being pivotally mounted to the housing and having one end thereof engageable with the switch and another end thereof engaged with the second member, the cam member being movable from an open position at which the supply of power is not interrupted when the second member is in the third position to a closed position at which the switch is closed by the cam member to interrupt the supply of power when the second member is moved to the fourth position.

In a modified embodiment of the invention, the second member comprises a trigger ball movably mounted in the housing, the trigger ball engaging the first member and a locking ball when the first member is in the first position and the trigger ball is in the third position, the trigger ball being movable to the fourth position when the first member moves to the second position, whereby the drive member forces the locking ball to move from a locking position to a non-locking position and the driven member is free to rotate under the influence of a torsion spring to shut off the valve.

In a third embodiment the engaging means comprises plunger means slidably mounted in the housing for engaging a switch which comprises the component for interrupting the supply of power from a power supply comprising electricity carried in an electric line. The plunger means comprises a plunger slidably mounted in a bore in the housing, the plunger including a locking ball receiving seat therein and being movable from a retained position at which the switch is not closed to a released position at which the switch is closed by the plunger. The drive assembly further includes a locking ball and a trigger ball, the trigger ball being movably mounted in the housing, and engaging the first member and the second member when the first member is in the first position, the second member is in the third position and the trigger ball is in a locking position. The trigger ball is movable to a releasing position due to movement of the first member from the first position to the second position, whereby the second member is released from the third position and is moved to the fourth position due to a force exerted thereon by the plunger locking ball. The locking ball is movably mounted in the housing from a locking position, at which the locking ball is received in the locking ball receiving seat and the plunger is prevented from moving with respect to the housing when the second member is in the third position, to a non-locking position, at which the locking ball is released from the locking ball receiving seat and the plunger is free to move with respect to the housing when the second member is in the fourth position.

In the foregoing embodiments, a cavity is provided in either the drive member or the housing and the inertia responsive means comprises an inertia ball received in the cavity. The first member includes a cup-shaped member fixed to one end thereof and part of the inertia ball is fully received in a recess in the cup-shaped member when the first member is in the first position, and the first member is moved to the second position when the inertia ball moves out of contact with a wall of the cavity or when the inertia ball is displaced so that such part of the inertia ball is not fully received in the recess.

BRIEF DESCRIPTION OF THE DRAWINGS

Several preferred embodiments of the invention will now be described with reference to the drawings, in which:

FIG. 6 is a cross-sectional view of a second embodiment of the invention shown in a released condition;

FIG. 7 is a cross-sectional view of the embodiment of in FIG. 6, but shown in a locked position;

FIG. 8 is an end cross-sectional view of the embodiment of FIG. 6;

FIG. 9 is a cut-away transverse cross-sectional view of the embodiment of FIG. 6; and FIG. 10 is a cross-sectional view of a third embodiment of the invention.

DESCRIPTION OF THE PREFERRED EMBODIMENTS

Figure 1:
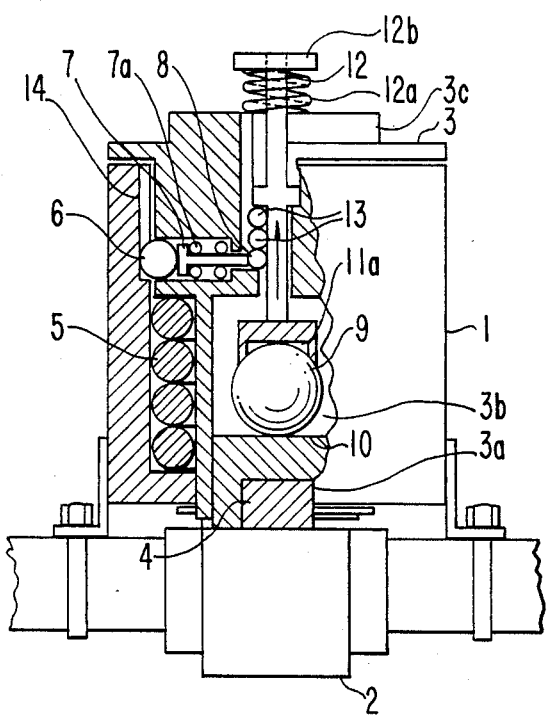
FIG. 1 is a cross-sectional view of a first embodiment of the invention.
Figure 2:
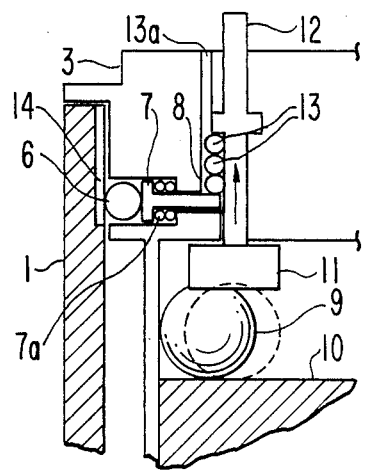
FIG. 2 is a cross-sectional view of part of the invention shown in FIG. 1.
Figure 4:
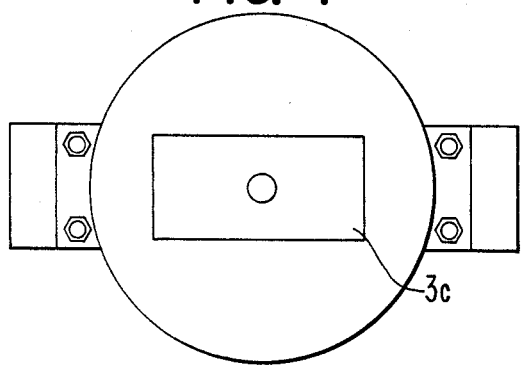
FIG. 4 is a top view of the invention shown in FIG. 1.

A first embodiment of the invention is shown in FIGS. 1–4 wherein the vibration or shock activated shut-off device of the present invention comprises a housing 1, a drive assembly means supported by the housing 1 for interrupting a supply of power from a power supply by moving a component such as a switch or a valve for interrupting the supply of power from the power supply. The drive assembly means includes a first member comprising a drive pin 12 which is movable rectilinearly from a first position (as shown in FIG. 1) to a second position (as shown in FIG. 2) and a second member comprising a spring loaded locking pin 7 which is movable rectilinearly from a third position (as shown in FIG. 1) to a fourth position (as shown in FIG. 2). The second member 7 is held in the third position when the first member is in the first position and the second member is movable to the fourth position when the first member is in the second position. The drive assembly means further includes component engaging means engageable with the component of the power supply and responsive to movement of the second member so that the component is in a power supplying position when the second member 7 is in the third position and in a power interrupting position when the second member 7 is in the fourth position. Inertia responsive means is also provided for moving the first member 12 from the first position to the second position in response to a vibration or shock being imparted to the housing.

The drive assembly means also includes a drive member 3 supported in the housing 1 for rotation about a rotation axis, and the component engaging means includes an opening 3a in the drive member 3 which is centered on the rotation axis and which is sized to receive, the component of the power supply, i.e. a valve stem 4 of a shut-off valve. The drive member further includes a cavity 3b in which the inertia responsive means is contained, the inertia responsive means comprising an inertia ball 9. The first member 12 extends into the cavity 3b and has one end thereof in engagement with the inertia ball 9 whereby the first member is movable from the first position to the second position in response to movement of the inertia ball. A cup-shaped member 11 is fixed to the one end of the first member 12 and the cup-shaped member has a recess 11a therein for receiving part of the inertia ball 9. The first member 12 is in the first position when such part of the inertia ball 9 is fully received in the recess 11a and engaged with a wall 10 of the cavity, and the first member 12 is moved by the inertia ball 9 to the second position when, as a result of a shock being imparted to the device, the inertia ball 9 moves out of contact with the wall 10 of the cavity and also when the inertia ball is displaced such that such part of the inertia ball is not fully received in the recess 11a, thus causing movement of the first member 12 relative to the drive member 3. Means such as a spring can be provided for biasing the first member 12 to the first position, the spring being interposed between the first member 12 and the drive member 3 such as at a position between the cup-shaped member 11 and an upper wall of the cavity 3b or in another cavity (not shown) provided in an upper part of the drive member 3 such that the spring is compressed between an upper wall of the cavity and a projection on the first member 12. Alternatively, the first member 12 can extend outwardly from the drive member 3 and a compression spring 12a can be interposed between a calibration knob 12b threadedly engaged with the first member and the drive member 3 such that the first member 12 is biased towards the inertia ball 9.

The drive assembly means further includes a trigger ball 8 movably mounted in the fixed member 3, the trigger ball 8 engaging the first member 12 and the second member 7 when the first member is in the first position, the second member 7 is in the third position and the trigger ball 8 is in a locking position. The trigger ball 8 is movable to a releasing position due to movement of the first member 12 from the first position, to the second position whereby the second member 7 is released from the third position and is moved to the fourth position due to a force exerted thereon in a manner to be discussed below. Thus, when the first member 12 moves from the first position to the second position, the trigger ball 8 rolls from its locking position to its releasing position. A locking ball 6 is movably mounted in the driven member 3, and is movable from a locking position, at which the drive member 3 is prevented from rotation with respect to the housing 1 when the second member 7 is in the third position, to a non-locking position, at which the drive member 3 is free to rotate with respect to the housing 1 when the second member is in the fourth position. Means also is provided for rotating the drive member 3 with respect to the housing 1 when the locking ball 6 is in the non-locking position. As shown in FIG. 1, the housing 1 comprises a hollow cylinder which is open at an upper end thereof and in which the drive member 3 is received. The housing includes a locking ball receiving seat 14 in which the locking ball 6 is received with it is in the locking position. The seat 14 comprises a semi-cylindrical channel extending parallel to the rotation axis of the drive member 3, but the depth of the channel 14 is less than the radius of the locking ball 6 so that the locking ball 6 does not become trapped in the channel 14 when the second member 7 moves to the fourth position. Finally, to effect rotation of the drive member 3 with respect to the housing 1, the rotating means comprises a torsion spring 5 having one end engaged with the housing 1 and the other end engaged with the drive member 3. The drive member 3 further includes a tool engaging lug 3c on the upper end thereof, whereby the drive member 3 can be wound, i.e. rotated from a position at which the torsion spring 5 does not exert a force on the drive member to a position at which the torsion spring 5 does exert a force on the drive member 3. To prevent damage to the cut-off valve 2, the housing 1 and the drive member 3 can include projections which engage each other when the drive member 3 is driven by the torsion spring 5 to the position at which the cut-off valve 2 is turned off or a suitable effect can be achieved by selecting a torsion spring 5 which will expand to contact the housing 1 when the torsion spring 5 is fully released. In other words, the outer periphery of the torsion spring 5 will contact the inner wall of the housing 1 as the drive member 3 reaches the position at which the cut-off valve stem 4 shuts off the cut-off valve 2.

In summary, the drive member 3 is connected to a cut-off valve stem 4 and rotates within the outer housing 1 due to a preloaded torsion spring 5 which will almost instantly perform a shut-off operation of the valve. When the drive member 3 is rotated against the spring pressure of the torsion spring 5 to the position at which the valve 2 is opened, the locking ball 6 engages in the recess 14 in the housing 1 thus allowing the spring loaded locking pin 7 to engage locking ball 6 when the trigger ball 8 is held between the spring loaded locking pin 7 and the drive pin 12. The unit now is cocked under adequate pressure such that thereafter when seismic activity produces sufficient forces acting in any direction to cause the inertia ball 9 resting on surface 10 as illustrated in FIG. 1 to move the cup-shaped member 11 and thus move the drive pin 12 from the first position to the second position as shown in FIG. 2 then trigger ball 8 moves upwardly, second member 7 moves to the fourth position, locking ball 6 is released from recess 14 under the torsional force of spring 5, and spring 5 rotates drive member 3 relative to housing 1, thus moving stem 4 to a position to close valve 2.

Figure 3:
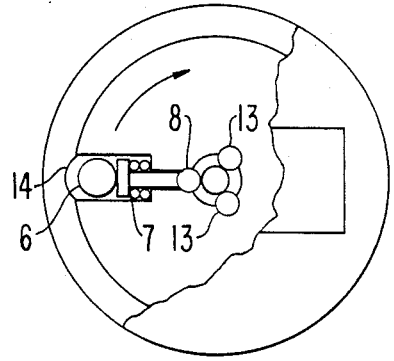
FIG. 3 is a cut-away cross-sectional view of the invention shown in FIG. 1.

A spring 7a can be interposed between the second member 7 and the drive member 3 for biasing the second member 7 to the third position. In addition, a plurality of balls 13 are provided between the first member 12 and the drive member 3, the balls 13 being arranged in a plurality of rows (as shown in FIG. 3), and each of the rows of balls are received in a channel 13a extending along a bore provided in the drive member 3. The first member 12 can include a projection for preventing escape of the balls outwardly of the bore in the fixed member 3.

Figure 5:
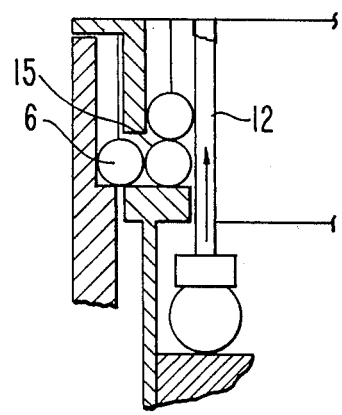
FIG. 5 is a cross-sectional view showing a modification of the invention shown in FIG. 1.

A modification of the first embodiment is shown in FIG. 5. In this modification the second member comprises a trigger ball 15 movably mounted in the fixed member 3, the trigger ball 15 engaging the first member 12 and the locking ball 6 when the first member 12 is in the first position and the trigger ball 15 is in a third position i.e. a position between first member 12 and locking ball 6, as shown in FIG. 5. The trigger ball 15 is movable to a fourth position, i.e. a position displaced upwardly from the position shown in FIG. 5, when the first member 12 moves to the second position, whereby the drive member 3 forces the locking ball 6 to move from the locking position to the non-locking position and the drive member 3 is free to rotate under the influence of the rotating means comprising the torsion spring 5 to shut off the valve 2.

A second embodiment of the present invention will now be described with reference to FIGS. 6-9. In the second embodiment the component engaging means comprises cam means for engaging an electric switch 17 which comprises the component for interrupting the supply of electric power from an electric power supply. The cam means comprises a cam member 18 pivotally mounted about a pivot axis 20 to the housing 1. The cam member 18 has one end thereof engageable with the switch 17 and another end thereof engaged with a second member 22. The cam member 18 is movable from an open position at which the supply of power is not interrupted when the second member 22 is in a retained third position shown in FIG. 7 to a closed position at which the switch 17 is closed by the cam member 18 to interrupt the supply of power when the second member 22 is moved to a released fourth position shown in FIG. 6. To enable the unit to perform the function of turning off an electric switch, the unit is mounted to a panel 16 of a circuit breaker box or the unit can be simply mounted to a wall in proximity to the switch 17.

A spring 23 is interposed between the housing 1 and the second member 22 for biasing the second member to the fourth position. The one end of the cam member 18 comprises a camming surface 18a which moves the switch 17 to a closed position when the cam member 18 is moved to the closed position. The drive assembly means further comprises a locking ball 21 movably mounted in the housing 1. The locking ball 21 is movable from a locking position at which the second member 22 is prevented from moving from the retained position when a first member 25 is in a first position to a non-locking position at which the second member 22 is moved to the released position by the spring 23 when the first member is moved to a second position. The second member 22 has a locking ball receiving seat or recess 22a in which the locking ball 21 is received when in the locking position. The second member 22 is prevented from moving out of the retained position due to engagement of the locking ball 21 with the first member and the locking ball receiving seat 22a of the second member 22. As shown in FIGS. 6-9, the locking ball receiving seat 22a comprises a slot in the second member 22, the slot being smaller than the diameter of the locking ball 21.

As in the first embodiment, the first member 25 is received in a bore provided in the housing 1, and a plurality of balls 26 are slidably fitted in the bore between the first member and the housing 1 for guiding the first member between the first position and the second position. The plurality of balls are arranged in a plurality of rows (as shown in FIG. 9), each of the rows of balls being received in a channel 26a extending along the bore, the channel 26a extending in directions parallel to a direction in which the first member moves from the first position to the second position.

A modification of the first and second embodiments is shown in FIGS. 6-9 wherein the first member 25 comprises a tubular member 14 which works in the same manner as the cup-shaped member 11. The inertia responsive means comprises an inertia ball 24 having a diameter greater than an inner diameter of an opening in the tubular member 25, the opening fully receiving a part of the inertia ball when the first member is in the first position. The first member is movable to the second position in response to movement of the inertia ball in a direction perpendicular to a central axis of the tubular member and in response to movement of the inertia ball in a direction towards the tubular member, since the outer periphery of the inertia ball 24 will engage the lower edges of the tubular member, as shown in FIG. 6. As in the first embodiment, the first member comprising the tubular member 25 includes a projection which prevents the balls 26 from escaping from the bore in the housing 1.

As a modification of the first and second embodiments, the first member can include a flat surface which engages the inertia ball 9, 24, but the wall of the cavity which is engaged by the inertia ball 9, 24 will then be concave such that the ball 9, 24 will move in a direction towards the first member due to a shock being imparted to the housing 1 or fixed member 3. Thus, the inertia ball 9, 24 will act in the same manner as in the first and second embodiments.

A third embodiment of the invention is shown in FIG. 10. In this embodiment, the component engaging means comprises a plunger slidably mounted in a bore in the housing 1 for engaging an electric switch 17 which comprises the component for interrupting the supply of electrical power. The plunger 27 includes a locking ball receiving seat 27a therein, and the plunger is movable from a retained position at which the switch 17 is not closed to a released position at which the switch 17 is closed by the plunger 27. The drive assembly further includes a locking ball 28 and a trigger ball 8 as in the first embodiment, as well as a second member 29. The trigger ball 8 is movably mounted in the housing and engages the first member 25 and the second member 29 when the first member is in the first position, the second member is in the third position and the trigger ball 8 is in a locking position. The trigger ball 8 is movable to a releasing position due to movement of the first member 25 from the first position to the second position, whereby the second member 29 is released from the third position and is moved to the fourth position due to a force exerted thereon by the plunger resulting from a spring 30 compressed between an end of the plunger 27 and an inner wall of a bore in the housing 1. The locking ball 28 is movably mounted in the housing 1 such that it is movable from a locking position, at which the plunger 27 is prevented from moving with respect to the housing 1 when the second member 29 is in the third position, to a non-locking position, at which the plunger 27 is free to move with respect to the housing when the second member 29 is in the fourth position.

While the present invention has been described with reference to the foregoing embodiments, it will be understood by those skilled in the art that various changes and modifications may be made thereto which fall within the scope of the appended claims.

What is claimed is:

1. A vibration or shock activated shut-off device comprising:
   a housing;
   a first member mounted within said housing for rectilinear movement between a first position and a second position;
   a second member mounted within said housing for movement between a third position and a fourth position;
   said second member being in said third position when said first member is in said first position, and said second member being movable to said fourth position when said first member is moved to said second position;
   an engaging member operably positioned with respect to said housing to be, in response to movement of said second member, movable relative to said housing and with respect to a component of a power supply between an opening position, at which said second member is in said third position and the component maintains the power supply open, and a closing position, at which said second member is in said fourth position and said engaging member causes the component to close the power supply;
   moving means for, upon said first member moving from said first position to said second position, moving said second member from said third position to said fourth position and moving said engaging member from said opening position to said closing position; and
   inertia responsive means for, upon a shock being imparted to said device, moving said first member from said first position to said second position, thereby allowing said moving means to move said second member from said third position to said fourth position, and moving said engaging member from said opening position to said closing position, thereby causing the component to close the power supply, said inertia responsive means comprising an inertia ball positioned loosely for free movement within a cavity, said first member extending into said cavity, and said inertia ball being separate from and not connected to said first member but being abuttable therewith upon the shock being imparted to said device.

2. A device as claimed in claim 1, further comprising a plurality of ball members guiding movement of said first member from said first position to said second position.

3. A device as claimed in claim 2, wherein said plurality of ball members are arranged in plural rows extending parallel to the direction of movement of said first member.

4. A device as claimed in claim 1, wherein said second member is movable rectilinearly perpendicular to the rectilinear movement of said first member.

5. A device as claimed in claim 1, wherein said engaging member includes a drive member mounted within said housing for rotation relative thereto about a rotation axis, said drive member having a coupling for engaging a valve stem of a shut-off valve forming the component of the power supply, such that rotation of said drive member from said opening position to said closing position closes the valve.

6. A device as claimed in claim 5, wherein said first and second members are mounted for movement in respective bores in said drive member, said cavity is in said drive member, and said inertia ball abuts a surface of said drive member defining said cavity.

7. A device as claimed in claim 6, wherein said moving means comprises spring means operable between said housing and said drive member for urging said drive member to said closing position.

8. A device as claimed in claim 7, wherein said spring means comprises a torsion spring mounted between said housing and said drive member.

9. A device as claimed in claim 7, further comprising means for, when said second member is in said third position and said first member is in said first position, maintaining said drive member in said opening position against the urging force of said spring means.

10. A device as claimed in claim 9, wherein said maintaining means comprises a locking ball abutting said second member and fitting into a recess in said housing when said drive member is in said opening position, whereby upon said inertia ball moving said first member to said second position the force of said spring means forces said locking ball out of said recess to move said second member to said fourth position.

11. A device as claimed in claim 10, further comprising a trigger ball located at a position between said first member and said second member when said first member is in said first position and said second member is in said third position, said trigger ball being movable away from said position by movement of said first member from said first position to said second position, thereby enabling movement of said second member from said third position to said fourth position.

12. A device as claimed in claim 1, wherein said engaging means comprises a cam member pivotally mounted to said housing for movement between said opening and closing positions, said cam member having a first end engaged by said second member, and said cam member having at a second end thereof a cam surface for engaging an electric switch forming the component of the power supply, such that pivoting of said cam member from said opening position to said closing position closes the switch.

13. A device as claimed in claim 12, wherein said moving means comprises spring means biasing said second member to said fourth position.

14. A device as claimed in claim 13, further comprising means for, when said first member is in said first position, maintaining said second member in said third position against the force of said spring means.

15. A device as claimed in claim 14, wherein said maintaining means comprises a locking ball located at a position abutting said first member and fitting within a recess in said second member when said second member is in said third position, said locking ball being movable away from said position by movement of said first member from said first position to said second position, whereby said spring means moves said second member to said fourth position, thereby pivoting said cam member to said closing position.

16. A device as claimed in claim 1, wherein said engaging member comprises a plunger mounted within said housing for rectilinear movement between said opening and said closing positions, said plunger member having a portion for engaging an electric switch forming the component of the power supply, such that rectilinear movement of said plunger member from said opening position to said closing position closes the switch.

17. A device as claimed in claim 16, wherein said moving means comprises spring means biasing said plunger member to said closing position.

18. A device as claimed in claim 17, further comprising means for, when said first member is in said first position and said second member is in said third position, maintaining said plunger member in said opening position against the force of said spring means.

19. A device as claimed in claim 18, wherein said maintaining means comprises a locking ball abutting said second member and fitting into a recess in said plunger member when said plunger member is in said opening position, whereby upon said inertia ball moving said first member to said second position, the force of said spring means forces said locking ball out of said recess to move said second member to said fourth position.

20. A device as claimed in claim 19, further comprising a trigger ball located at a position between said first member and said second member when said first member is in said first position and said second member is in said third position, said trigger ball being movable away from said position by movement of said first member from said first position to said second position, thereby enabling movement of said second member from said third position to said fourth position.

21. A device as claimed in claim 1, wherein said first member has, at an end thereof extending into said cavity, a recess confronting said cavity.

* * * * *